United States Patent [19]

Eguchi

[11] Patent Number: 4,484,231
[45] Date of Patent: Nov. 20, 1984

[54] PRINTING APPARATUS

[75] Inventor: Yasuhito Eguchi, Ebina, Japan

[73] Assignee: Sony Corporation, Tokyo, Japan

[21] Appl. No.: 306,766

[22] Filed: Sep. 29, 1981

[30] Foreign Application Priority Data

Sep. 30, 1980 [JP] Japan .................. 55-136847

[51] Int. Cl.³ .............. H04N 1/22; H04N 1/40; G01D 15/10
[52] U.S. Cl. .................. 358/296; 358/284; 346/76 PH; 400/120
[58] Field of Search .................. 340/720, 728; 346/76 PH; 400/120, 121; 382/50, 52, 56; 358/280, 296, 284; 178/30

[56] References Cited

U.S. PATENT DOCUMENTS

| 3,413,412 | 11/1968 | Townsend .................. 358/280 |
| 3,696,387 | 10/1972 | Nussbaum .................. 178/30 X |
| 3,697,976 | 10/1972 | Fznton .................. 340/728 |
| 4,176,272 | 11/1979 | Powers .................. 346/76 PH X |
| 4,262,188 | 4/1981 | Beach .................. 346/76 PH X |
| 4,290,084 | 9/1981 | Minshull et al. .................. 358/284 X |
| 4,334,231 | 6/1982 | Regehr .................. 346/76 PH X |
| 4,877,972 | 3/1983 | O'Neil .................. 346/76 PH X |

FOREIGN PATENT DOCUMENTS

| 30121 | 3/1977 | Japan .................. 400/121 |
| 79184 | 6/1980 | Japan .................. 400/120 |
| 1343298 | 1/1974 | United Kingdom . |

Primary Examiner—Aristotelis M. Psitos
Attorney, Agent, or Firm—Lewis H. Eslinger; Alvin Sinderbrand

[57] ABSTRACT

A printing apparatus for printing a picture which is formed by a plurality of full and half dots on the screen of a television receiver in response to a luminance signal supplied thereto, includes an integration circuit for integrating the transmitted signal and having a time constant which is selected so that the integrated transmitted signal of a saw-tooth waveform rises to a first level greater than a threshold level when the transmitted signal corresponds to a full dot of displayed information and rises to a second level less than the threshold level when the transmitted signal corresponds to half dot information; a latch circuit for latching the integrated transmitted signal only when the level thereof is greater than the threshold level in response to a latch signal supplied thereto, so as to produce an output signal corresponding only to that portion of the displayed picture formed of full dots; and a printer for printing the picture in response to the output signal.

8 Claims, 22 Drawing Figures

FIG.3
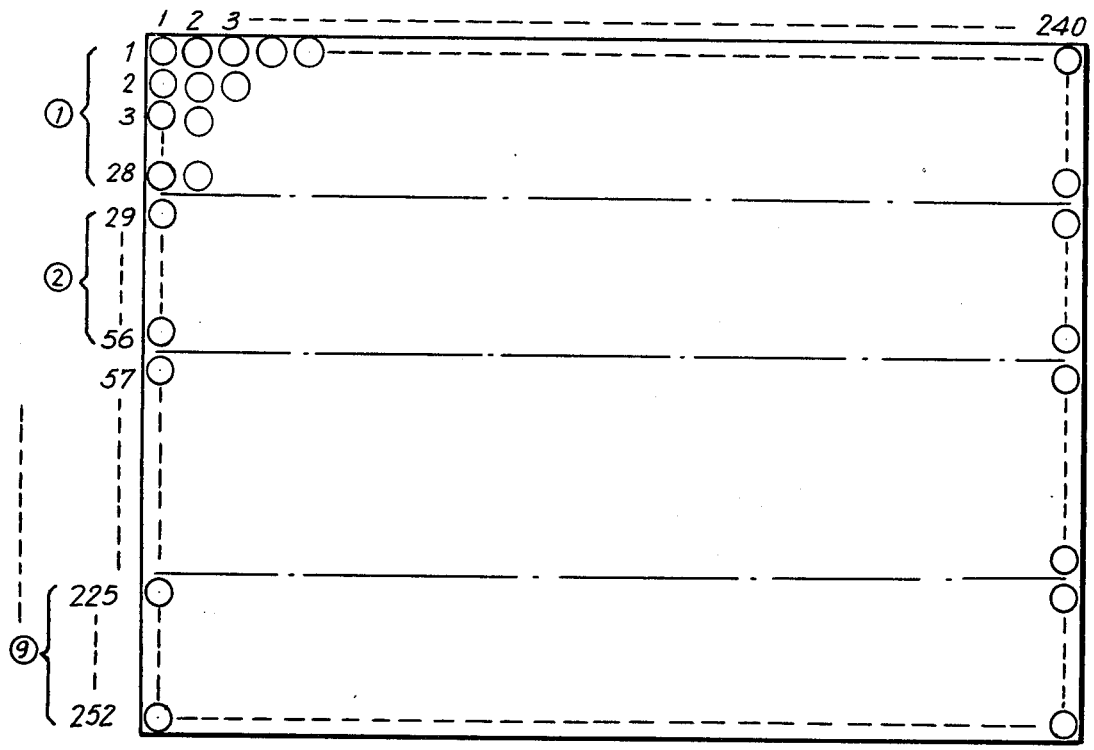
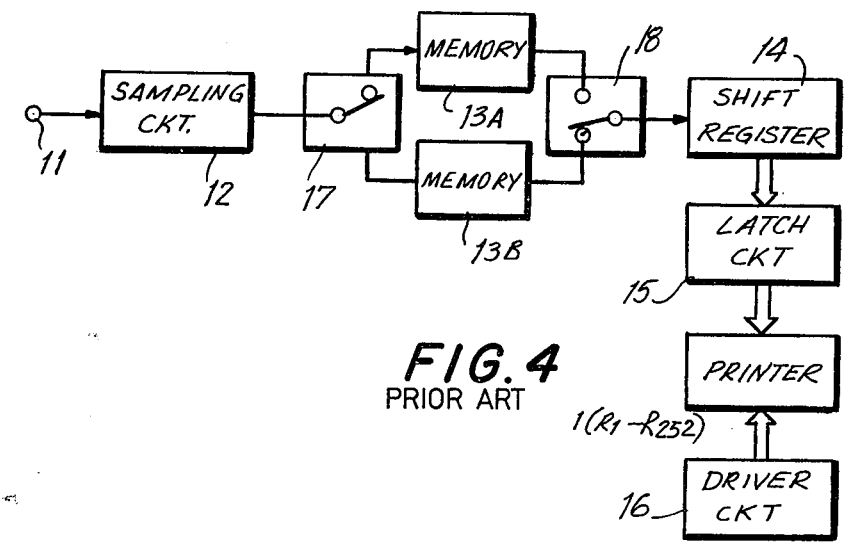
FIG.4
PRIOR ART

FIG.5
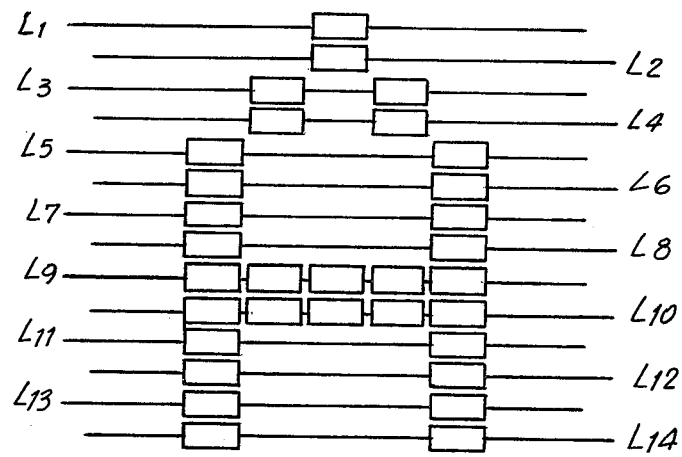
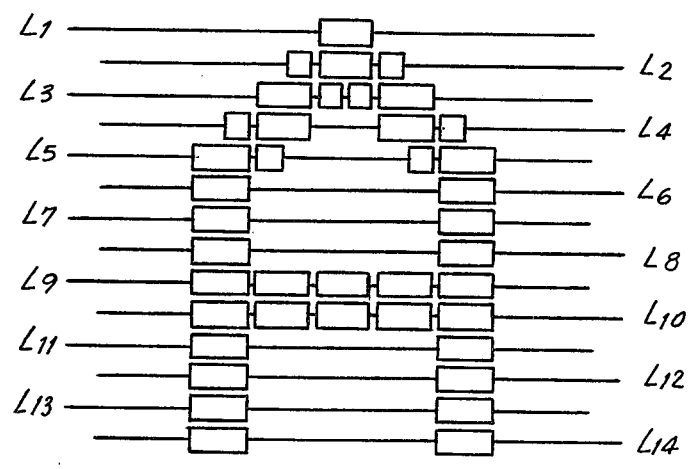
FIG.6

FIG.7A
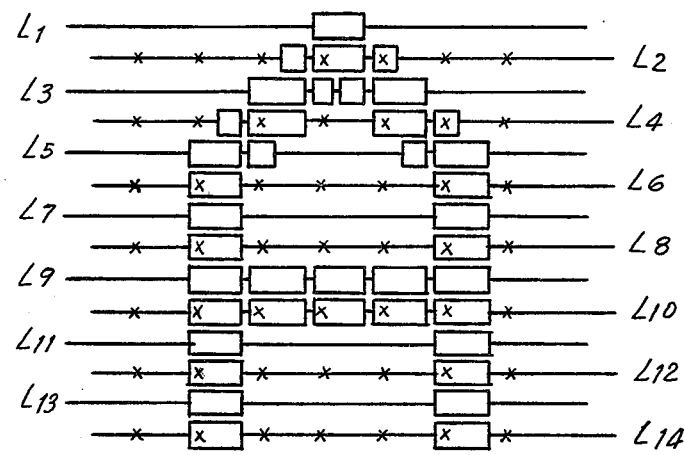
FIG.7B
FIG.7C
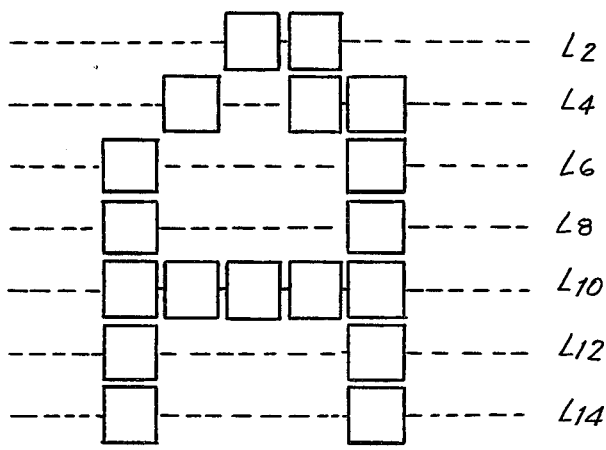

PRINTING APPARATUS

BACKGROUND OF THE INVENTION

1. Field of the Invention

The present invention relates generally to printing devices and, more particularly, is directed to a printing device for producing a hard copy of a picture displayed on the screen of a television receiver.

2. Description of the Prior Art

Various systems, such as the "TELETEXT" and "VIEWDATA" systems, are known in which news, weather and other information are transmitted, for example, during the vertical blanking period of a television broadcast or through a telephone circuit, to a television receiver where such information is displayed. With these systems, each number, letter or other symbol is converted to a code signal and then transmitted to the receiving end of the system where the code signal is decoded to the original number, letter or other symbol and then displayed on the screen of the television receiver. For example, for the letter "A", a corresponding code signal "41" may be transmitted to a character generator at the receiving end which, in response thereto, generates a luminance signal corresponding to the letter "A" and supplies the same to the television receiver. Accordingly, the letter "A" is displayed on the screen of the television receiver.

With the above system, a printer can be connected to the television receiver for printing a hard copy of the picture, that is, the combination of numbers, letters or other symbols, which are displayed on the screen of the television receiver. It should be appreciated, however, that a printer cannot operate at the speed at which the luminance signal is supplied to the television receiver. Since the picture displayed on the screen of the television receiver is a still picture, that is, it remains on the screen long enough for the viewer to read the information, the luminance signal is sampled with a suitable sampling frequency to enable the printer to follow the luminance signal as the corresponding numbers, letters or other symbols are being displayed on the screen of the television receiver so as to print the sampled output thereof and thereby produce the desired hard copy.

Generally, the numbers, letters or other symbols displayed on the screen of the television receiver are formed from a plurality of pictoral elements, which will hereinafter be referred to as full or normal dots. In order to more clearly display the numbers, letters or other symbols on the screen, a plurality of half dots, having half the width of a normal or full dot, are added to the pictoral representation to provide a more rounded look to the numbers, letters or other symbols, thereby making the latter easier to see. However, various problems have arisen with the different control circuits used to control the printer. It is to be first noted that the printer is only adapted to print a full pictoral element on the hard copy in response to the sampled signal supplied thereto. Thus, with one known printer circuit, if a signal corresponding to a half dot of information displayed on the screen of the television receiver is sampled, the printer will print a full pictoral element on the hard copy. Accordingly, the numbers, letters and other symbols which are printed on the hard copy may become distorted.

In another proposed printer circuit, two separate sampling circuits and a logic circuit are provided to eliminate the sampled luminance signal corresponding to each half dot of information. However, because this circuit requires two sampling circuits and a logic circuit, the circuit is relatively complicated. Further, with this circuit, the sampled luminance signal corresponding to successive half dots of displayed information is interpreted by the logic circuit as corresponding to a full dot of information, so that the printer incorrectly prints a full pictoral element.

OBJECTS AND SUMMARY OF THE INVENTION

Accordingly, it is an object of this invention to provide a printing apparatus that avoids the above-described difficulties encountered with prior art.

More particularly, it is an object of this invention to provide a printing apparatus for printing a picture, which is formed by a plurality of full and half pictoral elements on the screen of a television receiver, as a hard copy without the half pictoral elements.

It is another object of this invention to provide a printing apparatus that is of a relatively simple construction.

In accordance with an object of this invention, apparatus is provided for printing a picture which is displayed by display means in response to a transmitted signal, the displayed picture being formed by a plurality of full and half pictoral elements, the apparatus including integration means for integrating the transmitted signal and having a time constant; latch means for latching the integrated transmitted signal in response to a latch signal supplied thereto so as to produce an output signal, the phase of the latch signal and the time constant of the integration means being selected so that the output signal corresponds only to that portion of the displayed picture formed of full pictoral elements; and printing means for printing the picture in response to the output signal.

The above, and other, objects, features and advantages of the present invention will become readily apparent from the following detailed description of an illustrative embodiment of the invention which is to be read in connection with the accompanying drawings.

BRIEF DESCRIPTION OF THE DRAWINGS

FIG. 3 is a schematic diagram of the dot arrangement on the screen of a television receiver;

FIG. 4 is a block diagram of a printing circuit according to the prior art;

FIG. 5 is a schematic diagram of a letter that is adapted to be displayed on the screen of FIG. 3 without rounding;

FIG. 6 is a schematic diagram of a letter that is adapted to be displayed on the screen of FIG. 3 with rounding;

FIG. 7A is a schematic diagram of the letter of FIG. 6, illustrating the points in the even field thereof at which the luminance signal is sampled by the prior art circuit of FIG. 4;

FIG. 7B is a time chart illustrating the sampling pulses used in the prior art circuit of FIG. 4;

FIG. 7C is a schematic diagram of the hard copy of the letter of FIG. 7A produced when the luminance signal is sampled during the even field thereof with the prior art circuit of FIG. 4;

FIGS. 9A–9G are waveform diagrams used for explaining the operation of the circuit of FIG. 8;

DETAILED DESCRIPTION OF A PREFERRED EMBODIMENT

Figure 1:
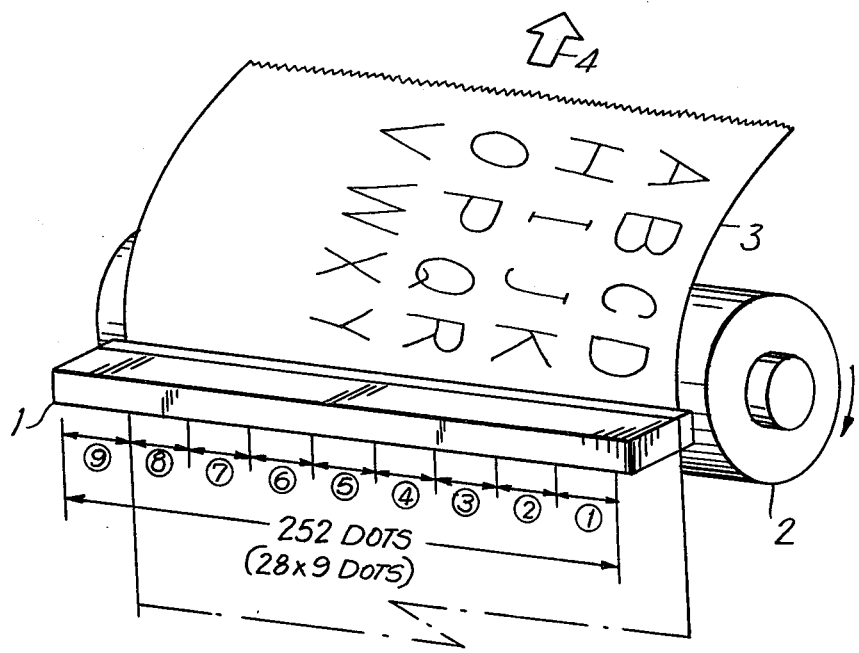
FIG. 1 is a schematic perspective view of a printer with which the present invention can be utilized.
Figure 2:
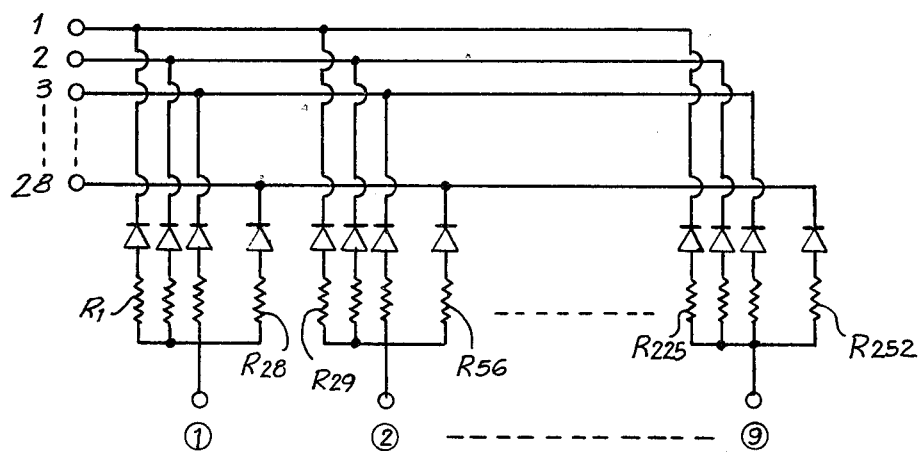
FIG. 2 is a circuit-wiring diagram of the thermal control elements for the printer of FIG. 1.

Referring to the drawings in detail, and initially to FIGS. 1 and 2 thereof, there is shown a printer with which the present invention is adapted to be utilized. In particular, the printer includes a cylindrical platen 2 and a recording head 1 positioned longitudinally adjacent platen 2. Recording paper 3 is positioned between recording head 1 and platen 2 and is longitudinally advanced in the direction of arrow 4 in FIG. 1 during the printing operation. In the printer shown in FIGS. 1 and 2, recording head 1 is a thermal recording head which is comprised of a plurality of controllable heating resistors $R_1$–$R_{252}$ (FIG. 2), and recording paper 3 is a thermal paper which is sensitive to the heat generated by the resistors of recording head 1.

The screen of the television receiver with which the present invention is also utilized is comprised of a plurality of horizontal and vertical rows, as shown in FIG. 3. For the purpose of illustrating the present invention, the screen of FIG. 3 is formed in a rectangular matrix with a plurality of pictoral elements, illustrated as being full or normal dots. In particular, each horizontal line on the screen includes 240 dots and each vertical column includes 252 dots, with each dot being selectively activated to display a combination of desired numbers, letters, or other symbols on the television screen. It is to be appreciated, however, that although dots have been utilized in the screen of FIG. 3, any other suitable configuration may be utilized. Also, although the television screen of FIG. 3 has been shown with 240 dots in each horizontal line and 252 dots in each vertical column, these numbers may also vary. However, consistent therewith, recording head 1 includes 252 resistors $R_1$–$R_{252}$, as previously stated, which are used as heating elements along the longitudinal direction of platen 2, corresponding to each vertical column of dots on the television screen of FIG. 3. Resistors $R_1$–$R_{252}$ are arranged in nine sets of 28 resistors for easy control thereof.

A known printer circuit for controlling the operation of the printer is shown in FIG. 4. With this circuit, a luminance signal from a character generator is supplied to the television receiver, resulting in a still motion picture be displayed on the screen thereof by selective illumination of the dots thereon. Hereinafter, the term picture will refer to any combination of letters, numbers or any other pictoral representation. With this arrangement, one field of pictoral information is provided on the screen when a luminance signal necessary to selectively activate all of the dots on the screen has been supplied to the television receiver. As will hereinafter become apparent, for each pictoral representation displayed on the screen, at least 240 field intervals of the luminance signal are supplied to the television receiver.

The luminance signal is also supplied through an input terminal 11 to a sampling circuit 12 of the printer circuit of FIG. 4. During the first field interval, sampling circuit 12 sequentially samples the luminance signal corresponding to the first dot of information displayed on the screen of FIG. 3 for each of the 252 horizontal lines or rows. In other words, the luminance signal corresponding to the first column of dot information displayed on the screen of FIG. 3 is sampled by sampling circuit 12 during the first field interval. The sampled signal during the first field interval is stored in a memory 13A which is connected to sampling circuit 12 through a switch 17.

During the next or second field interval, in which the same or substantially the same luminance signal is supplied to the television receiver, sampling circuit 12 sequentially samples the luminance signal corresponding to the second dot of information displayed on the screen of FIG. 3 for each horizontal line or row. In other words, the luminance signal corresponding to the second column of dot information displayed on the screen of FIG. 3 is sampled by sampling circuit 12 during the second field interval. In this manner, sampling circuit 12 sequentially samples the luminance signal column by column until all 240 columns are sampled.

During the second field interval, the sampled contents of memory 13A are read out therefrom and supplied through a switch 18, a serial-to-parallel shift register 14, and a latch circuit 15 to recording head 1. It is to be appreciated that, in such case, switch 18 is changed over from the condition shown in FIG. 4. A driver circuit 16 is also connected to recording head 1 for selecting the respective set or sets of thermal resistors to be activated. In this manner, thermal resistors $R_1$–$R_{252}$ of recording head 1 are controlled to print a hard copy of a picture corresponding the first column of displayed dot information. Further, during the second field interval, switch 17 is changed over from the condition shown in FIG. 4 so that the output of sampling circuit 12, corresponding to the second column of displayed dot information, is stored in a memory 13B. Then, during the third field interval, switches 17 and 18 are once again changed over to the condition shown in FIG. 4 so that new information is stored in memory 13A and the contents of memory 13B, corresponding to the second column of displayed information is printed by recording head 1. This procedure continues until the last column of displayed dot information is printed by recording head 1 so as to produce a hard copy of the picture displayed on the screen of FIG. 3.

Referring now to FIG. 5, there is shown a schematic diagram of the letter "A" displayed on the screen of FIG. 3 without a rounding operation being performed. In the diagram of FIG. 5, lines $L_1$–$L_{14}$ illustrate the horizontal scan lines, with the odd scan lines $L_{2n+1}$ being formed during the odd field intervals and the even scan lines $L_{2n}$ being formed during the even field intervals. It is to be appreciated that the letter "A" is shown in FIG. 5 as being formed of a plurality of boxes rather than dots merely for ease of illustration. Because the displayed letter "A" may be difficult to see by the viewer, the aforementioned character generator generally produces a luminance signal which results in a more detailed or rounded letter "A", as shown in FIG. 6, by utilizing both full and half dots, in which the width of each half dot is one-half that of a normal or full dot. In this manner, the letter "A" takes on a more rounded appearance and is easier to see by a viewer.

It should be appreciated, from a review of FIG. 6, that the luminance signal produced by the character generator during the odd field intervals is different from the luminance signal produced during the even field intervals, as a result of the rounding operation, unlike the case of FIG. 5 where no rounding occurs. Accordingly, sampling should only be performed during either the even field intervals or the odd field intervals. However, the printer is only adapted to print full or normal pictoral elements of information and is not adapted to print half pictoral elements, corresponding to the half dots of information displayed on the screen of FIG. 3. Thus, for example, if the luminance signal, corresponding to the x-marks in FIG. 7A, is sampled during an even field interval, at a sampling rate determined by the sampling pulses of FIG. 7B, the printer will print a hard copy, as shown in FIG. 7C. It should be appreciated that, because of the asymmetry between the pictures in the odd and even fields, distortion in the printed letter "A" results. More particularly, this distortion results because the printer of FIG. 1 prints a full pictoral element when the luminance signal corresponding to a displayed half dot is sampled or detedted. Further, such distortion is only changed and is not corrected by changing the phase of the sampling pulses or by sampling the luminance signal during the odd field intervals.

Figure 8:
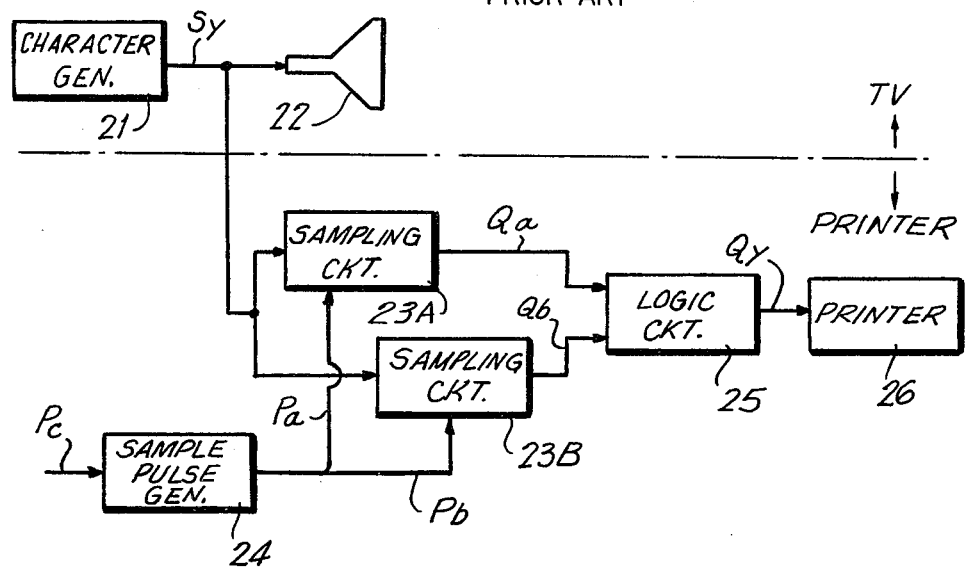
FIG. 8 is a block diagram of another printing circuit according to the prior art.
Figure 9A:
Figure 9B:
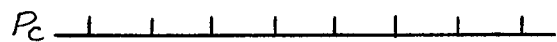
Figure 9D:
Figure 9E:
Figure 9F:
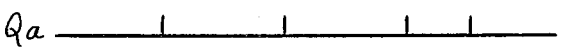
Figure 9G:

In order to overcome this deficiency, it has been proposed to provide circuitry to prevent the printing of a full pictoral element on the hard copy in response to the sampled luminance signal corresponding to eachhalf dot of displayed information. In particular, as shown in FIG. 8, a character generator 21 generates a luminance signal $S_y$ (FIG. 9A) which is supplied to a television receiver 22 at which a picture formed of full and half dots is displayed. The shaded areas of the luminance signal $S_y$ shown in FIG. 9A correspond to half dots of information. Luminance signal $S_y$ is also supplied to sampling circuits 23A and 23B of the printer circuit. A sampling pulse generator 24, which is supplied with a clock pulse signal $P_c$, in response thereto, supplies pulses $P_a$ (FIG. 9C) and $P_b$ (FIG. 9D) to sampling circuits 23A and 23B, with the phase of pulses $P_a$ and $P_b$ being different from each other. It is to be appreciated, of course, that sampling circuits 23A and 23B correspond in structure and operation to sampling circuit 12 of FIG. 4. The outputs $Q_a$ (FIG. 9E) and $Q_b$ (FIG. 9F) of sampling circuits 23A and 23B are supplied to a logic circuit 25 which, in turn, supplies a modified luminance signal $Q_y$ (FIG. 9G) having no half dot information to a printer 26 for producing the aforementioned hard copy. Since the luminance signal $S_y$ is sampled at different times in sampling circuits 23A and 23B, if only one of the outputs $Q_a$ and $Q_b$ is produced, it is determined that the luminance signal contains a half dot of information. If both outputs $Q_a$ and $Q_b$ are produced, it is determined that the luminance signal includes a full dot of information. In this manner, logic circuit 25 eliminates from the modified luminance signal $Q_y$ all half dots of information so that the luminance signal $Q_y$ causes the letter "A", as shown in the schematic diagram of of FIG. 5, to be printed. Accordingly, a hard copy is obtained without the half dot information. However, it should be appreciated that the circuit of FIG. 8 is of a relatively complicated construction because of the use of two sampling circuits with two distinct sampling pulses and the use of the logic circuit. Further, if the luminance signal $S_y$ is comprised of continuous half dots of information, logic circuit 25 determines that a full dot of information exists and causes the same to be printed on the hard copy as a full pictoral element.

Figure 10:
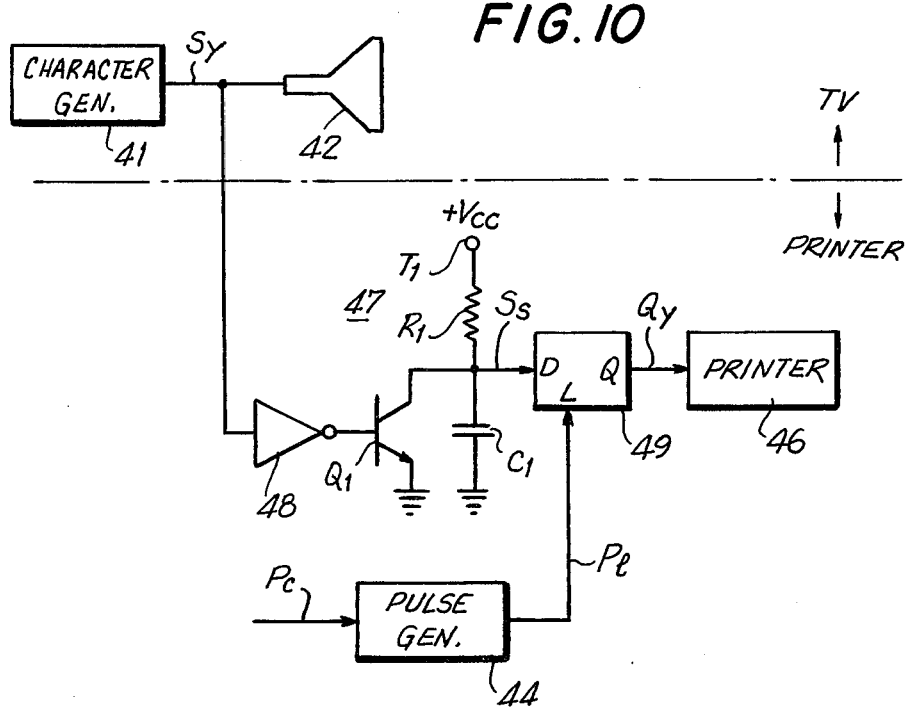
FIG. 10 is a circuit wiring-block diagram of a printing circuit according to one embodiment of the present invention.
Figure 11A:
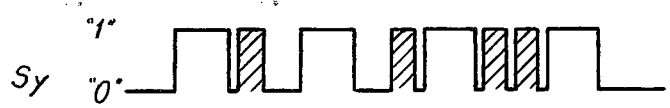
FIGS. 11A–11D are waveform diagrams used for explaining the operation of the circuit of FIG. 10.

Referring now to FIG. 10, there is shown a printer circuit according to one embodiment of the present invention, in which a character generator 41 supplies the luminance signal $S_y$ (FIG. 11A) containing both full and half dot information to a television receiver 42 at which a picture formed of full and half dots is displayed. Luminance signal $S_y$ is also supplied to an inverter 48 of the printer circuit which, in turn, supplies an inverted output to the base of an NPN transistor $Q_1$ having its emitter connected to ground. A resistor $R_1$ and a capacitor $C_1$ are connected in series between a power supply terminal $T_1$ supplied with a power supply voltage $+V_{cc}$, and ground, and the connection point between resistor $R_1$ and capacitor $C_1$ is connected to the collector of transistor $Q_1$. Transistor $Q_1$, resistor $R_1$ and capacitor $C_1$ thereby form an integration circuit 47. The connection point between resistor $R_1$ and capacitor $C_1$ constitutes the output of integration circuit 47, at which is produced an integrated saw-tooth signal $S_s$ (FIG. 11B), and this latter signal is supplied to the D-input terminal of a latch circuit 49, which is preferably constituted by a D-type flip-flop circuit. As is apparent from FIG. 11B, saw-tooth signal $S_s$ has a value which is less than a threshold voltage $V_{TH}$ for half-dot information. The threshold voltage $V_{TH}$ may, for example, be equal to one-half the power supply voltage $+V_{cc}$. The printer circuit according to this invention also includes a pulse generator 44 which is supplied with a clock signal $P_c$ and which, in turn, produces a latch pulse $P_l$ (FIG. 11C), which is synchronized with clock signal $P_c$ and which is delayed by 270 degrees from the beginning of each clock period so as to occur during the latter half of each full dot information. Latch pulse $P_l$ is supplied to a latch input L of latch circuit 49 for controlling the operation thereof.

Figure 11B:
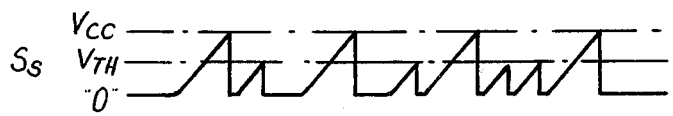
Figure 11C:
Figure 11D:
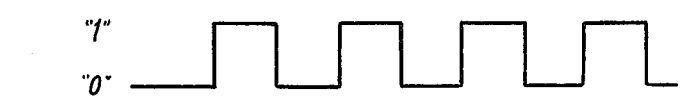

In accordance with the above construction, when the level of the luminance signal $S_y$ is at a high logic level condition, transistor $Q_1$ is turned OFF, whereby capacitor $C_1$ is charged through resistor $R_1$ from power supply terminal $T_1$. On the other hand, when the level of the luminance signal $S_y$ is at a low logic level condition, transistor $Q_1$ is turned ON and capacitor $C_1$ is rapidly discharged through the collector-emitter path of transistor $Q_1$. In this manner, signal $S_s$, having a saw-tooth waveform, as shown in FIG. 11B, is obtained in correspondance with luminance signal $S_y$. Signal $S_s$ is then supplied to the D-input terminal of latch circuit 49. However, latch circuit 49 is constructed to latch and then transmit only those signals supplied thereto which have a level above the aforementioned threshold level $V_{TH}$. It should be appreciated from a review of FIG. 11B that the portion of signal $S_s$ corresponding to half dot information is below the threshold voltage $V_{TH}$ and is therefore not latched and transmitted by latch circuit 49, but that the portion of signal $S_s$ corresponding to the last half of full dot information has a level above threshold voltage $V_{TH}$. Accordingly, because of the relationship of the threshold voltage $V_{TH}$ of latch circuit 49 and the phase of latch signal $P_l$ to signal $S_s$, output luminance signal $Q_y$ from latch circuit 49 includes only full dot information. This luminance signal $Q_y$, which is devoid of the half dot information is then supplied to a printer 46 whereby the displayed picture is printed as a hard copy. It should be appreciated that the present invention overcomes the problems previously discussed in regard to the prior art circuit of FIG. 8. Thus, in addition, to being of a relatively simple construction, the present invention prevents half dot signals from being interpreted as full dot signals.

It should be appreciated that the circuit of FIG. 10 may be modified by one of ordinary skill in the art within the scope of the present invention, as defined by the claims herein. In particular, although latch pulse $P_l$ has been shown with a 270° phase relation with respect to each full dot of information, it is to be appreciated that latch pulse $P_l$ may be positioned anywhere where within signal $S_s$ corresponding to the last half (or last 180°) of each full dot of information when the threshold voltage $V_{TH}$ is equal to one-half the power supply voltage $+V_{cc}$. In other words, it is only important that the latch pulse $P_l$ activate latch circuit 49 when the level of signal $S_s$ corresponding to full dot information is greater than the threshold voltage $V_{TH}$. Since the positioning of latch pulse $P_l$ need not be precise, the construction of the present invention becomes even simpler. Further, the time constant of integration circuit 47, which is determined by resistor $R_1$ and capacitor $C_1$ need only be selected so that the level of signal $S_s$ is not greater than the threshold voltage $V_{TH}$ during any half dot period of the signal $S_y$. This also results in a simpler construction of the circuit of FIG. 10.

Having described a specific preferred embodiment of the present invention with reference to the accompanying drawings, it is to be understood that the present invention is not limited to that precise embodiment, and that various changes and modifications may be effected therein by one skilled in the art without departing from the scope or spirit of the invention as defined in the appended claims.

What is claimed is:

1. Apparatus for printing a picture corresponding to a picture displayed by display means in response to a transmitted signal, said display means displaying said displayed picture as a plurality of full and half pictorial elements, said transmitted signal containing information indicating the presence of a half pictorial element, a full pictorial element, or the absence of either, and wherein said picture is printed in the form of full pictorial elements, said apparatus comprising:

integration means for integrating said transmitted signal and having a time constant;

the integrated transmitted signal having a first characteristic indicative of the presence of a half pictorial element in said transmitted signal and a second characteristic indicative of the presence of a full pictorial element in said transmitted signal;

means for generating a latch signal having a predetermined phase relation to said integrated transmitted signal;

latch means for latching said integrated transmitted signal in response to said latch signal supplied thereto so as to produce an output signal, said latch signal causing said latch means to latch said integrated transmitted signal at regular times determined by said time constant and said predetermined phase relation such that said latch means produces said output signal only when said integrated transmitted signal, at the time of latching, has said second characteristic, whereby said output signal corresponds to that portion only of the integrated transmitted signal indicative of the presence of a full pictorial element; and printer means for printing said picture in response to said output signal in the form of full pictorial elements.

2. Apparatus according to claim 1; in which said integration means includes resistive means and capacitive means for determining the value of said time constant.

3. Apparatus according to claim 2; in which said integration means further includes discharge means connected to said capacitive means, said capacitive means charges at a rate determined by said time constant when the transmitted signal corresponds to one of a full and half pictorial element, and said capacitive means discharges through said discharge means when the transmitted signal corresponds to the absence of either a full or half pictorial element.

4. Apparatus according to claim 3; in which said capacitive means and said resistive means are connected in series between first and second reference potentials, said discharge means includes transistor means having a base and a collector-emitter path connected in parallel with said capacitive means, and said apparatus further includes inverting means for inverting said transmitted signal and supplying said inverted transmitted signal to the base of said said transistor means, wherein said integrated transmitted signal rises to a first level greater than a threshold level when the transmitted signal corresponds to a full pictorial element and rises to a second level less than said threshold level when the transmitted signal corresponds to a half pictorial element.

5. Apparatus according to claim 1; in which said latch means produces said output signal only when the level of said integrated transmitted signal is greater than a threshold level; the value of said time constant is selected so that said integrated transmitted signal rises to a first level greater than said threshold level during a first interval after the integrated transmittal signal begins to rise when the transmitted signal corresponds to a full pictorial element and rises to a second level less than said threshold level during a second interval shorter than said first interval after the integrated transmitted signal begins to rise when the transmitted signal corresponds to a half pictorial element, thereby defining a third interval between the endings of said second and first intervals; and the phase of said latch signal is selected so that the latter is supplied to said latch means during said third interval.

6. Apparatus according to claim 1; in which said latch means includes D-type flip-flop means having a D-input terminal supplied with said integrated transmitted signal, a latch input terminal supplied with said latch signal, and an output terminal at which said output signal is produced.

7. Apparatus according to claim 1; further including pulse generating means for producing said latch signal in response to a clock signal supplied thereto.

8. Apparatus according to claim 1; further including character generating means for producing said transmitted signal.

* * * * *